Nov. 6, 1956  R. K. MARTIN ET AL  2,769,269
FISH LURE
Filed June 28, 1954  2 Sheets-Sheet 1
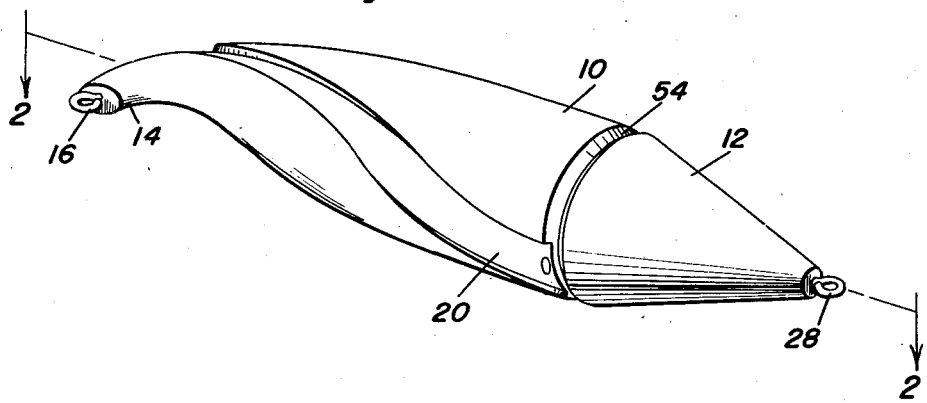
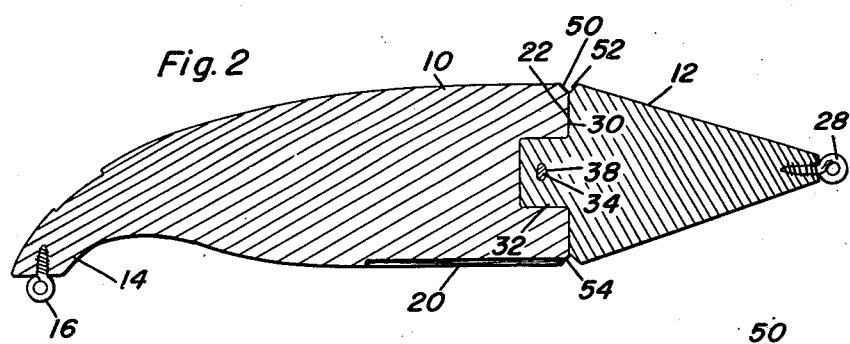
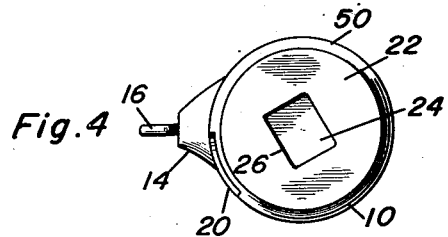
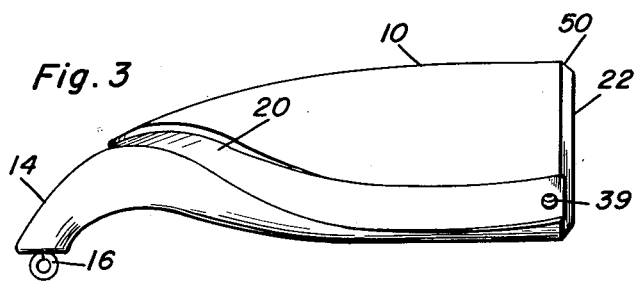
Rex K. Martin
John S. Bartlett
INVENTORS.

Nov. 6, 1956 R. K. MARTIN ET AL 2,769,269
FISH LURE
Filed June 28, 1954 2 Sheets-Sheet 2
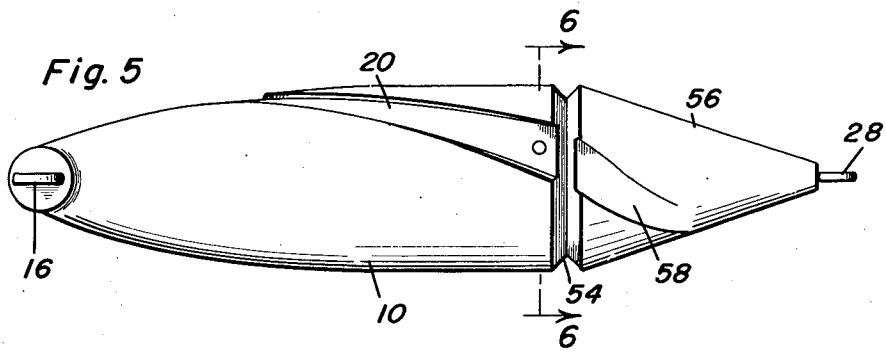
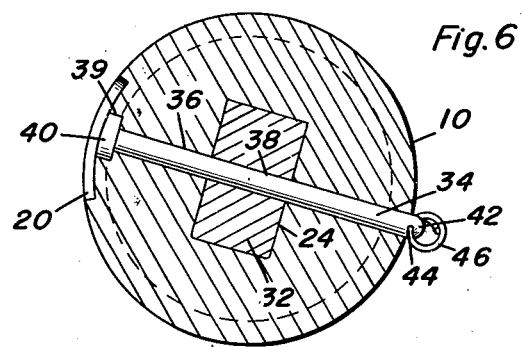
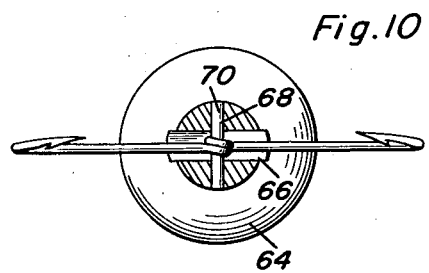
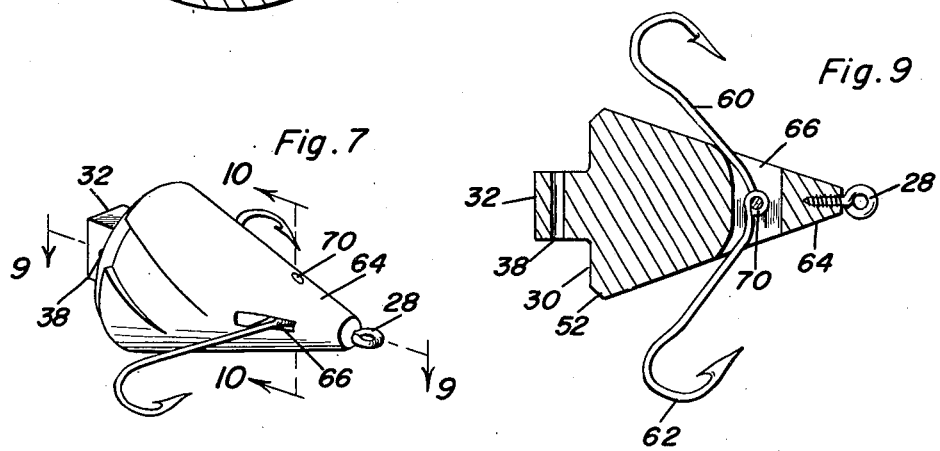
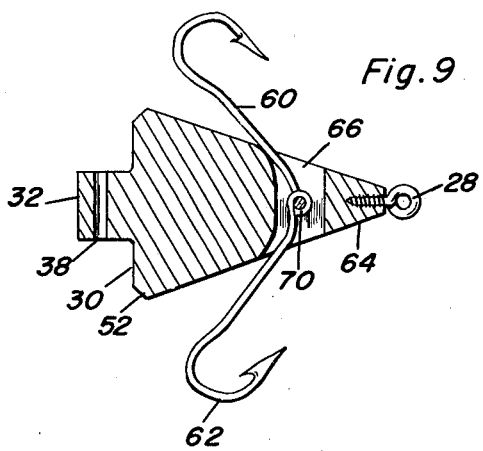
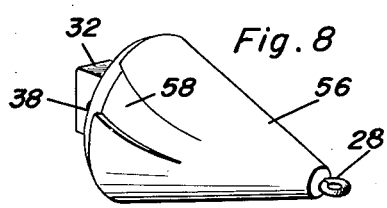
Rex K. Martin
John S. Bartlett
INVENTORS.

United States Patent Office 2,769,269
Patented Nov. 6, 1956

2,769,269

FISH LURE

Rex K. Martin and John S. Bartlett, Ovid, Mich.

Application June 28, 1954, Serial No. 439,572

1 Claim. (Cl. 43—42.46)

This inventinon relates to a fish lure and particularly to a revolving wabbling lure having detachable selectively usable head members for varying the animated action characteristics of the lure.

When using artificial lures in fishing operations it has been found that spirited and life-like action of the lure is vital and that the degree of activity should be different on different days to insure worthwhile results.

The construction according to the present invention has to do with a rotating lure of a wabbling type in which the extent and duration of the action is largely dependent upon the type of head mounted on a prescribed or so-called standard body.

In the construction according to the present invention, the elongated tapered body is provided with a laterally curved posterior or tail portion to provide the desired wabble motion and a spiral groove winding around the surface of the body to cause rotation thereof. A plurality of basically similar heads is provided any one of which may be chosen and removably secured on the body by means of a simple fastener and these heads may have different types of grooves which communicate with the spiral groove on the body so that the desired speed of rotation may be attained thereby. Also, one form or embodiment of the head may be provided with suitable means for attaching fish hooks thereto while other fish hooks may be or may not be attached to the body.

It is accordingly an object of the invention to provide a fish lure having a combined rotating and wobbling motion.

Other objects and many of the attendant advantages of the present invention will be apparent from the following detailed description taken in conjunction with the accompanying drawing in which:

Figure 1 is a perspective view of a fish lure according to the invention;

Figure 2 is a longitudinal section through the lure taken substantially on the plane indicated by the section line 2—2 of Figure 1;

Figure 3 is an elevational view of the body portion of the lure;

Figure 4 is a front end view of the body portion of the lure;

Figure 5 is a bottom plan view of the lure with a slightly modified head;

Figure 6 is an enlarged cross sectional view through the lure taken taken substantially on the plane indicated by the section line 6—6 of Figure 5 and showing the manner of attaching the heads to the lure body;

Figure 7 is a perspective view of a modified head according to the invention;

Figure 8 is a perspective view of the modified head per se shown in Figure 5;

Figure 9 is a section taken substantially on the plane of the section line 9—9 of Figure 7 with parts shown in elevation; and Figure 10 is a cross section taken substantially on the plane of the line 10—10 of Figure 7.

In the exemplary embodiment according to the invention, a lure is provided having an elongated tapering body portion 10 and a substantially conical head portion 12. The body portion 10 is provided with a laterally extending posterior portion 14 in which is secured a hook engaging eye 16. A substantially spiral slot 20 is formed in the body 10 and extends substantially a full turn therearound and terminates adjacent to the posterior portion 14. Preferably the spiral groove 20 extends a little less than a full turn preferably of the order of 250 degrees.

The anterior end of the body 10 is provided with a substantially flat transverse portion 22 provided with an axial rectangular recess or keeper socket 24.

A substantially conical head member 12 is provided with a forward eye 28 for engagement with the usual swivel which connects the device to a leader line or other device. The head 12 is provided with a base 30 which is substantially flat and complementary to the flat anterior surface 22 of the body 10. The head 12 is provided with an axial boss or keeper 32 which substantially fits and extends into the recess 24 of the body 10 and may be of sufficiently tight fit to retain the body and head members operatively assembled. However, it is preferred to assemble the members by means of an assembly pin 34. For properly placing the assembly pin 34 in the device, the body 10 is provided with a transverse bore 36 on opposite sides of the recess 24 and the boss 32 is provided with a transverse bore 38 which aligns with the bore 36 so that the pin 34 may extend therethrough to lock the head and body in firm contact with each other.

Preferably the transverse bore 36 terminates at the bottom in the groove 20 and a counterbore 39 is provided in the bottom of the groove 20 about the bore 36 so that a flat head 40 on the pin 34 is received in the counterbore so it will be flush with or below the bottom of the groove 20. In order to secure the pin 34 in position in the body 10, the end 42 opposite to the head 40 is provided with a transverse bore 44 and a resilient fastener such as a wire ring 46 is extended through the bore 44.

The body 10 is provided with a beveled portion 50 adjacent the juncture of the outer surface of the body and the flat end 22 and the head 12 is provided with a beveled surface 52 at the periphery of the base 30 so that when the body 10 and the head 12 are assembled the beveled surfaces 50 and 52 will provide a substantially V-groove 54 at the juncture of the head and the body.

In order to modify the actuation of the bore, a head 56 may be provided, as shown in Figs. 5 and 8, with a spiral groove 58 which is a continuation of the spiral groove 20 in the body 10. The spiral groove 58 may extend to any desired extent of the head 56 so that the extent and depth of the groove 58 will help to determine the action of the entire lure.

In order to mount suitable hooks 60 and 62 on the head, a head 64 as shown in Figs. 7, 9 and 10 may be provided with a transverse slot 66 intermediate the ends of the head 64 and preferably adjacent the anterior end thereof and a transverse bore 68 may be placed in the head 64 on both sides of the slot 66. A hook fastening pin 70 extends through the bore 68 transversely of the slot 66 so that the eyes of the hook 60 and 62 may be secured thereon.

In the utilization of the lure according to the invention, the device will be secured by the eye 28 to a suitable swivel on a supporting leader or line and the desired hooks may be placed either on the pin 70 or on the eye 16, or both, as may be desired. The desired head will be selected and assembled and maintained on the body 10 by means of the pin 34.

It will be apparent to those skilled in the art that various changes and modifications in the construction and arrangements of the parts thereof may be readily resorted to without departing from the true spirit and scope of the invention.

What is claimed as new is as follows:

A self-rotating fish lure which has a spinning as well as a wobbly motion when drawn through a body of water comprising, in combination, an elongated rearwardly tapering body including a substantially flat anterior end, a posterior end appreciably reduced in cross-section and gradually and laterally curved relative to the longitudinal axis of said body, said body being circular in cross-section from end to end and having a spiral water channeling groove formed in its peripheral surface extending lengthwise from the anterior end to and opening through the posterior end of said body, a substantially conical head detachably mounted on the anterior end of said body, said body being beveled at the periphery of the flat anterior end, said head including a generally flat base and being beveled at the periphery of said base, said bevels being aligned, united and cooperating and thus providing an endless annular V-shaped groove at the junction of said body and said head, respectively, said body having an axially positioned substantially rectangular socket in the central portion of said anterior end, the base of said head having a corresponding axially disposed rectangular extension constituting a key and telescoping into and being thus removably keyed in said socket, said body also having a transverse bore extending through said socket with one end terminating in said groove, said extension having a bore aligned with the bore in said body, and a readily insertable and removable assembling and retaining pin extending through the aligned bores and thus detachably connecting said head to said body.

References Cited in the file of this patent

UNITED STATES PATENTS

| | | |
|---|---|---|
| D. 141,338 | Dryden et al. | May 22, 1945 |
| D. 151,106 | Vaughn | Sept. 21, 1948 |
| 1,107,881 | Berntsen | Aug. 18, 1914 |
| 1,288,118 | Morian | Dec. 17, 1918 |
| 1,415,354 | Jacobs et al. | May 9, 1922 |
| 1,464,215 | Olson | Aug. 7, 1923 |
| 1,588,690 | Babbitt | June 15, 1926 |
| 1,725,636 | Heaslip | Aug. 20, 1929 |
| 2,027,069 | Sorenson | Jan. 7, 1936 |
| 2,326,317 | Amstberg | Aug. 10, 1943 |
| 2,573,215 | Murphy | Oct. 30, 1951 |
| 2,592,445 | McCarthy | Apr. 8, 1952 |
| 2,640,292 | Nadolny | June 2, 1953 |
| 2,668,607 | Stiles et al. | Feb. 9, 1954 |

FOREIGN PATENTS

| | | |
|---|---|---|
| 7,807 | Great Britain | 1886 |